(12) United States Patent
Yuan et al.

(10) Patent No.: US 11,815,396 B2
(45) Date of Patent: Nov. 14, 2023

(54) DUAL-OPTICAL-PATH SPECTROPHOTOMETER AND COLOR MEASUREMENT METHOD THEREOF

(71) Applicant: CAIPU TECHNOLOGY (ZHEJIANG) CO., LTD., Zhejiang (CN)

(72) Inventors: Kun Yuan, Zhejiang (CN); Shuanghu Gong, Zhejiang (CN); Jian Wang, Zhejiang (CN)

(73) Assignee: CaiPu Technology (Zhejiang) Co., Ltd., Zhejiang (CN)

( * ) Notice: Subject to any disclaimer, the term of this patent is extended or adjusted under 35 U.S.C. 154(b) by 0 days.

(21) Appl. No.: 17/700,476

(22) Filed: Mar. 21, 2022

(65) Prior Publication Data

US 2022/0214216 A1 Jul. 7, 2022

Related U.S. Application Data

(63) Continuation of application No. PCT/CN2020/104778, filed on Jul. 27, 2020.

(30) Foreign Application Priority Data

Jun. 28, 2020 (CN) .......................... 202010596573.0

(51) Int. Cl.
*G01J 3/02* (2006.01)

(52) U.S. Cl.
CPC ........... *G01J 3/0251* (2013.01); *G01J 3/0208* (2013.01); *G01J 3/0232* (2013.01); *G01J 3/0237* (2013.01); *G01J 3/0294* (2013.01)

(58) Field of Classification Search
CPC ...... G01J 3/0251; G01J 3/0208; G01J 3/0232; G01J 3/0237; G01J 3/0294; G01J 3/0202;
(Continued)

(56) References Cited

U.S. PATENT DOCUMENTS

| 6,413,786 B1* | 7/2002 | Hansen | ............ G01N 33/54346 |
| | | | 436/805 |
| 2011/0226961 A1* | 9/2011 | Osawa | ...................... G01J 1/58 |
| | | | 250/458.1 |

(Continued)

FOREIGN PATENT DOCUMENTS

| CN | 101907493 | 12/2010 |
| CN | 202710184 | 1/2013 |

(Continued)

OTHER PUBLICATIONS

English Translation of CN101907493A Description (Year: 2010).*
(Continued)

*Primary Examiner* — Tarifur R Chowdhury
*Assistant Examiner* — Akbar Hassan Rizvi
(74) *Attorney, Agent, or Firm* — JCIPRNET

(57) ABSTRACT

Disclosed are a dual-optical-path spectrophotometer and a color measurement method thereof. The spectrophotometer includes an integrating sphere, a light source, and a sensor. A second shutter, a semi-reflecting and semi-transmitting device and lenses are arranged between the detection hole and the sensor, and a light guide device and a first shutter are arranged between a light guide hole formed in the integrating sphere and the semi-reflecting and semi-transmitting device. The color measurement method includes the following steps. A first shutter is closed, a second shutter is opened, light, reflected by the measuring opening, enters a sensor and the sensor measures a spectral reflected signal of the object surface. The first shutter is opened, the second shutter is closed, reflected light enters the sensor, and the sensor measures a spectral reflected signal of a light source. A final sampled signal is calculated.

8 Claims, 3 Drawing Sheets

(58) Field of Classification Search
CPC .......... G01J 3/0248; G01J 3/0297; G01J 3/42; G01J 3/46
See application file for complete search history.

(56) References Cited

U.S. PATENT DOCUMENTS

| | | | | |
|---|---|---|---|---|
| 2013/0003060 | A1* | 1/2013 | Kimura | G01J 3/08 356/319 |
| 2014/0192358 | A1* | 7/2014 | Barbieri | G01J 3/0256 356/402 |
| 2015/0369727 | A1* | 12/2015 | Sugioka | G01N 33/14 356/442 |
| 2019/0257745 | A1* | 8/2019 | Darby | G01J 3/08 |

FOREIGN PATENT DOCUMENTS

| | | |
|---|---|---|
| CN | 204594582 | 8/2015 |
| CN | 105318970 | 2/2016 |
| CN | 206161160 | 5/2017 |
| CN | 212340438 | 1/2021 |
| JP | 2019052972 | 4/2019 |

OTHER PUBLICATIONS

"International Search Report (Form PCT/ISA/210) of PCT/CN2020/104778," dated Mar. 25, 2021, with English translation thereof, pp. 1-5.

* cited by examiner

DUAL-OPTICAL-PATH SPECTROPHOTOMETER AND COLOR MEASUREMENT METHOD THEREOF

CROSS-REFERENCE TO RELATED APPLICATION

This application is a continuation of international application of PCT application serial no. PCT/CN2020/104778 filed on Jul. 27, 2020, which claims the priority benefit of China application no. 202010596573.0 filed on Jun. 28, 2020. The entirety of each of the above mentioned patent applications is hereby incorporated by reference herein and made a part of this specification.

TECHNICAL FIELD

The present invention relates to the technical field of optical color difference measurement, in particular to a dual-optical-path spectrophotometer and a color measurement method thereof.

BACKGROUND

Spectrophotometers are a detection instrument which calculates the color value by spectral analysis of the reflected light from the surface of an object. The measurement principle is that the light emitted by the light source irradiates to the surface of the measured object from the measuring aperture after continuous diffuse reflection in the integrating sphere, the reflected light from the object surface enters the spectral sensor after passing through the lenses and other optical devices carrying the color information of the object surface, the spectral sensor performs spectral processing on the optical signal collected and converts it into a different spectrum of optical intensity signal, the optical intensity signal is converted into an electrical signal through the photosensor in the spectral sensor, the electrical signal is converted into a digital signal through the integrated circuit, and the computer calculates the digital signal as a color value.

The spectrophotometers have two most important performance indexes, i.e., measurement repeatability and indication error. The measurement repeatability means that spectrophotometers make multiple measurements without changes of the surface of the measured object to measure the maximum change of the results. Among the factors affecting measurement repeatability, the intensity change of the light source itself is the most critical factor. In the process of multiple measurements, the intensity of the light source itself will have a certain energy fluctuation, which will directly affect the stability of measurement results.

The existing spectrophotometers usually adopt dual-optical-path design to eliminate the influence of light source fluctuation on measurement. An optical path is separately set to collect the intensity of the light source itself, e.g., an optical fiber is adopted to collect an optical signal from a light source, the optical signal is transmitted to a first spectral sensor, the first spectral sensor collects the first optical signal intensity, an optical signal reflected from a surface of a measured object enters a second spectral sensor, the second spectral sensor collects the second optical signal intensity, and a final sampled signal is obtained by calculating the intensity of such two optical signals. In this case, two spectral sensors are required to detect the signal intensity of the measured object and the light source respectively, and the cost is high.

SUMMARY

In order to solve the deficiencies of the prior art and achieve the purpose of lowering cost, the present invention adopts the following technical solutions:

A dual-optical-path spectrophotometer includes an integrating sphere, a light source matched with a light-through hole of the integrating sphere, and a sensor matched with a measuring port and a detection hole of the integrating sphere, wherein a second shutter, a semi-reflecting and semi-transmitting device and lenses are arranged between the detection hole and the sensor, reflected light at the measuring port enters the sensor through a penetrating face of the semi-reflecting and semi-transmitting device, a light guide device and a first shutter are arranged between a light guide hole formed in the integrating sphere and the semi-reflecting and semi-transmitting device, and reflected light from an inner surface of the integrating sphere enters the sensor through a reflecting surface of the semi-reflecting and semi-transmitting device.

An adjusting device is arranged on each of the lenses, configured to adjust positions of the lenses between the sensor and the detection hole and change a size of a sensor measurement area.

The lenses include a first lens and a second lens, wherein the semi-reflecting and semi-transmitting device is arranged between the first lens and the second lens, and an adjusting device is arranged on the second lens, configured to adjust a position of the second lens between the semi-reflecting and semi-transmitting device and the detection hole.

The adjusting device includes a sliding sleeve, a sleeve lever, a V-shaped spring and a fixed structure, wherein the sliding sleeve arranged in a detection cylinder is matched with the lenses through a stepped notch formed inside a top thereof, a lever hole formed in one side of the sliding sleeve is matched with a sliding groove formed in one side of the detection cylinder, the sleeve lever is inserted into the lever hole through the sliding groove, and the fixed structure arranged outside the detection cylinder is connected with the sleeve lever through the V-shaped spring; the V-shaped spring provides an upward force for the sleeve lever to be pulled upwards, so that the sliding sleeve is supported by the sleeve lever, a distance between the lenses and the sensor is shortened, a distance between the lenses and the detection hole is increased, and sliding down of the sliding sleeve due to gravity is avoided; provides a downward force for the sleeve lever to be pulled downwards, and coordinates the sleeve lever to better drive the sliding sleeve to slide down, so that a distance between the lenses and the sensor is increased, and a distance between the lenses and the detection hole is shortened; and finally changes an area size of the sensor measured from the measuring port.

The light guide hole is formed above the light-through hole, and a light barrier is arranged below an inner side of the light-through hole and can prevent light source from directly irradiating to the measuring port and prevent reflected light at the measuring port from irradiating into the light guide hole.

The semi-reflecting and semi-transmitting device is an inclined semi-reflecting and semi-transmitting glass, wherein an upper surface of the semi-reflecting and semi-transmitting glass is a reflecting surface and a lower surface is a penetrating face.

A light trap hole formed in the integrating sphere is matched with the measuring port and a camera arranged outside the integrating sphere, and a pick is arranged between the light trap hole and the camera.

A color measurement method for dual-optical-path spectrophotometer includes the following steps:

S1, first measurement process: a first shutter is closed, a second shutter is opened, light, reflected via a measuring port, from a surface of a measured object enters a sensor through a penetrating face of a semi-reflecting and semi-transmitting device and lenses matched with the semi-reflecting and semi-transmitting device, and the sensor measures a spectral reflected signal $I_1$ of the object surface;

S2, second measurement process: the first shutter is opened, the second shutter is closed, reflected light from an inner surface of an integrating sphere enters the sensor through a reflecting surface of the semi-reflecting and semi-transmitting device, and the sensor measures a spectral reflected signal $I_0$ of a light source; and S3, $I=I_1/I_0$ is taken as a final sampled signal.

The positions of the lenses between the sensor and the detection hole are adjustable, configured to change a size of a sensor measurement area.

An interval between the first measurement process and the second measurement process is 5 ms-100 ms.

The present invention features the following advantages and beneficial effects:

The optical signal intensity of the measured object and the light source itself can be measured by just one spectral sensor, and the final sampled signal can be obtained through calculation, greatly reducing the system cost on the basis of reducing the influence of the energy reducing the influence of the energy fluctuation of the light source on the stability of measurement results, and ensuring measurement repeatability.

1. sensor; 2. first shutter; 3. light guide column; 4. second shutter; 5. detection hole; 6. integrating sphere; 7. light guide hole; 8. light-through hole; 9. light source; 10. light barrier; 11. measuring port; 12. light trap hole; 13. pick; 14. camera; 15. second lens; 16. semi-reflecting and semi-transmitting glass; 17. first lens; 18. detection cylinder; 19. lever hole; 20. sleeve lever; 21. sliding groove; 22. sliding sleeve; 23. stepped notch; 24. retaining screw; 25. V-shaped spring.

DETAILED DESCRIPTION OF THE EMBODIMENTS

The specific implementation modes of the present invention will be described in detail below in combination with the accompanying drawings. The specific implementation modes described herein are used for describing and explaining the present invention only, rather than limiting the present invention.

Figure 1:
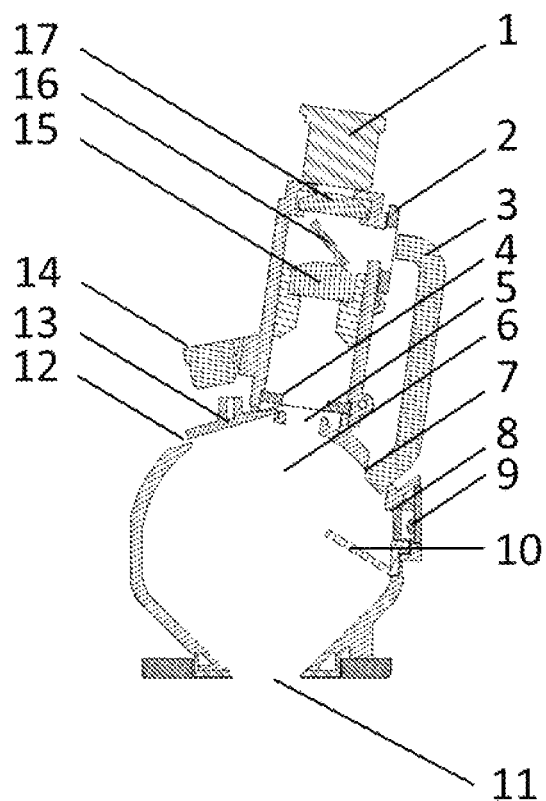
FIG. 1 is a structural sectional view of the present invention.
Figure 2A:
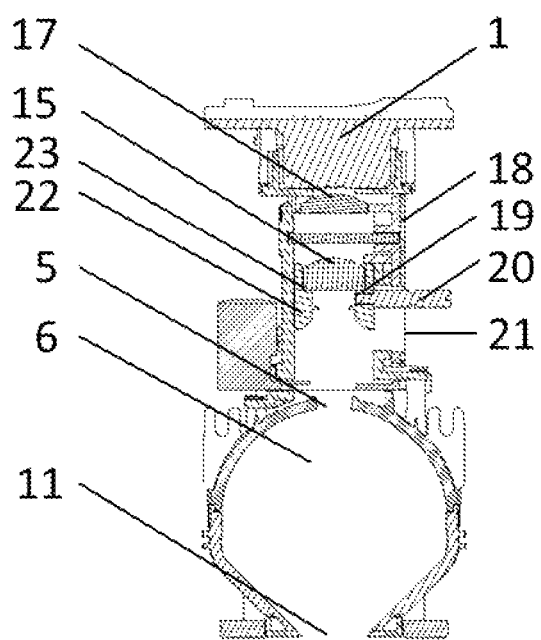
FIG. 2A is a structural sectional view of a part of an upward adjusting device in the present invention.
Figure 2B:
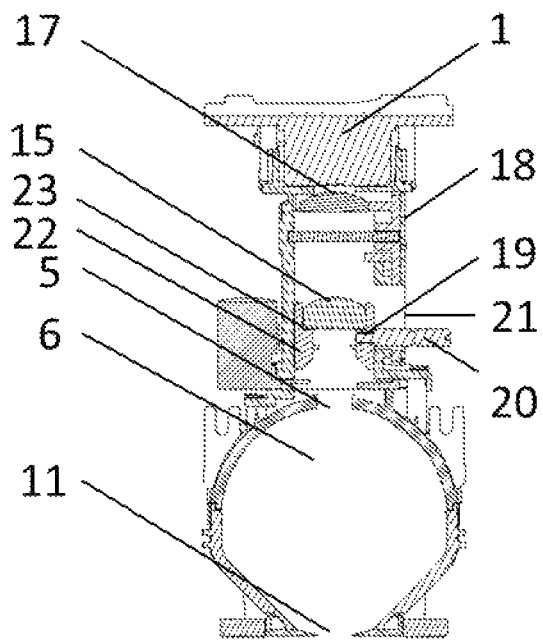
FIG. 2B is a structural sectional view of a part of a downward adjusting device in the present invention.
Figure 3A:
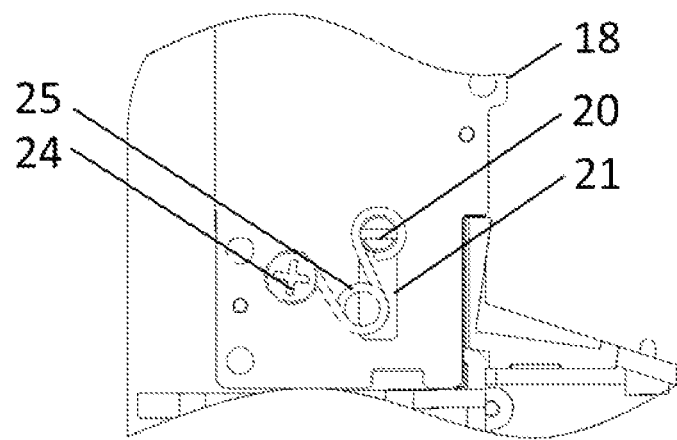
FIG. 3A is a lateral structural view of an upward adjusting device in the present invention.
Figure 3B:
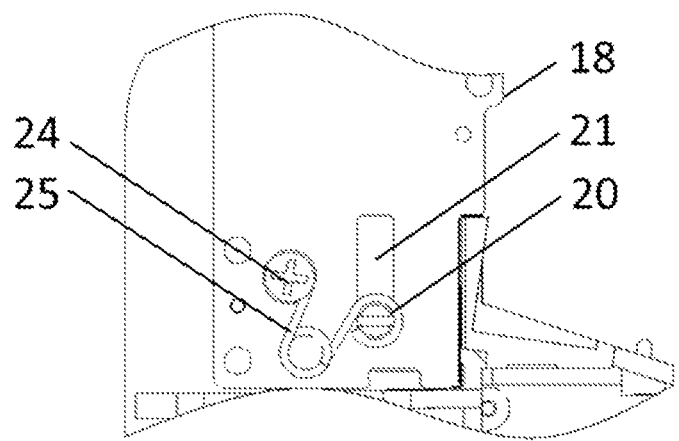
FIG. 3B is a lateral structural view of a downward adjusting device in the present invention.

As shown in FIG. 1, light emitted by a LED light source 9 enters an integrating sphere 6 after passing through an optical filter. The light irradiates to an object surface through a measuring port 11 after continuous inverse homogenization inside the integrating sphere 6. The reflected light from the object surface enters a spectral sensor 1 after passing through the measuring port 11, a detection hole 5, a second shutter 4, a second lens 15, a semi-reflecting and semi-transmitting glass 16 and a first lens 17 successively. Besides, a light guide hole 7 is formed in the integrating sphere 6, so that the light (excluding the reflected light from the object surface) from an inner surface of the integrating sphere 6 enters the spectral sensor 1 after passing through the light guide hole 7, a light guide column 3, a first shutter 2 and the semi-reflecting and semi-transmitting glass 16 successively; an upper surface of the semi-reflecting and semi-transmitting glass 16 is a reflecting surface which faces a light output hole of the light guide column 3, a lower surface is a penetrating face which faces the second lens 15, and the whole semi-reflecting and semi-transmitting glass 16 is inclined.

As shown in FIGS. 2A, 2B, 3A and 3B, an adjusting device is arranged on the second lens 15, configured to adjust positions of the lenses between the sensor 1 and the detection hole 5 and change an area size of the sensor 1 measured from the measuring port 11.

The adjusting device includes a sliding sleeve 22, a sleeve lever 20, a V-shaped spring 25 and a retaining screw 24, wherein the sliding sleeve 22 is arranged at an inner wall of a detection cylinder 18, a stepped notch 23 is formed in a top of the sliding sleeve 22 and configured to place the second lens 15, a lever hole 19 formed in one side of the sliding sleeve 22 is matched with a sliding groove 21 formed in one side of the detection cylinder 18, one end of the sleeve lever 20 is inserted into the lever hole 19 through the sliding groove 21, the retaining screw 24 is arranged outside the detection cylinder 18, and both ends of the V-shaped spring 25 are connected with the retaining screw 24 and the other end of the sleeve lever 20 respectively. When the sleeve lever 20 is pulled upwards from a bottom of the sliding groove 21, a distance between the retaining screw 24 and the sleeve lever 20 is shortened, and the V-shaped spring 25 suffers from an increased pressure; when the sleeve lever 20 is crossing a middle part of the sliding groove 21, a distance between the retaining screw 24 and the sleeve lever 20 is increased, and the V-shaped spring 25 suffers from a reduced pressure; under an action of an elastic force of the V-shaped spring itself, the V-shaped spring applies an upward force to the sleeve lever 20, so that the sleeve lever 20 slides to a top end of the sliding groove 21, thus moving the second lens 15 upwards through the sliding sleeve 22, shortening a distance between the second lens 15 and the sensor 1, increasing a distance between the sensor 1 and the detection hole 5, and changing an area size of the sensor 1 measured from the measuring port 11. When the sleeve lever 20 is pulled downwards from a top of the sliding groove 21, a distance between the retaining screw 24 and the sleeve lever 20 is shortened, and the V-shaped spring 25 suffers from an increased pressure; when the sleeve lever 20 is cross a middle part of the sliding groove 21, a distance between the retaining screw 24 and the sleeve lever 20 is increased, and the V-shaped spring 25 suffers from a reduced pressure; under an action of an elastic force of the V-shaped spring itself, the V-shaped spring applies a downward force to the sleeve lever 20, so that the sleeve lever 20 slides to a bottom end of the sliding groove 21, thus moving the second lens 15 downwards through the sliding sleeve 22, increasing a distance between the second lens 15 and the sensor 1, shortening a distance between the sensor 1 and the detection hole 5, and changing an area size of the sensor 1 measured from the measuring port 11.

Besides, a camera 14 is arranged outside the integrating sphere 6, the measuring port 11 is observed via a light trap hole 12 formed in one side of a top of the integrating sphere 6 and a measurement area is displayed on a screen, which facilitates a user to locate the measurement area; a pick 13 is arranged in the light trap hole 12, configured to realize a measurement structure of de:8°.

First measurement process: A first shutter 2 is closed, and a second shutter 4 is opened; at this time, light passes through a measuring port 11, a detection hole 5, the second shutter 4 and a second lens 15 successively after being reflected from a surface of a measured object, enters a reflecting surface from a penetrating face of a semi-reflecting and semi-transmitting glass 16 and is reflected, and then enters a spectral sensor 1 via a first lens 17; at this time, a signal measured by the spectral sensor 1 is a spectral reflected signal $I_1$ of the object surface.

Second measurement process: The first shutter 2 is opened, and the second shutter 4 is closed; at this time, a light guide column 3 passes light (excluding the reflected light from the object surface) from an inner surface of the integrating sphere 6 through the light guide hole 7, the light guide column 3 and the first shutter 2 successively, and the light is reflected from the reflecting surface of the semi-reflecting and semi-transmitting glass 16, and then enters the spectral sensor 1 via the first lens 17; at this time, a signal $I_0$ measured by the spectral sensor 1 is only related to a luminous intensity of a light source 9.

A baffle is arranged inside the integrating sphere 6 to ensure that the light reflected from the surface of the measured object will not directly enter the light guide column 3. The light guide hole 7 is formed above a light-through hole 8, and a light barrier 10 is arranged below an inner side of the light-through hole 8, and can prevent the light source 9 from directly irradiating to the measuring port 11 and prevent the reflected light at the measuring port 11 from irradiating into the light guide hole 7, so as to reduce influence of a surface color of the measure object on $I_0$.

$I=I_1/I_0$ is taken as a final sampled signal.

Due to a short interval between the first measurement process and the second measurement process, i.e., an opening or closing time of only one shutter, about 10 ms, it can be considered in this time interval that the luminous intensity and spectral distribution of the light source 9 do not change. Two measurement processes in the same state can obtain better measurement repeatability and avoid use of two spectral sensors, greatly reducing the cost.

The above-mentioned embodiments are only used for describing, rather than limiting, the technical solutions of the present invention. Although the present invention is described in detail by reference to the above-mentioned embodiments, those of ordinary skill in the art should understand that, they can still make modifications to the technical solutions recorded in the above-mentioned embodiments, or make equivalent substitutions to a part of or all technical characteristics thereof, but these modifications or substitutions will not make the corresponding technical solutions deviate from the scope of the technical solutions in the embodiments of the present invention.

What is claimed is:

1. A dual-optical-path spectrophotometer, comprising an integrating sphere, a light source matched with a light-through hole of the integrating sphere, and a sensor matched with a measuring port and a detection hole of the integrating sphere, wherein a second shutter, a semi-reflecting and semi-transmitting device and lenses are arranged between the detection hole and the sensor, reflected light at the measuring port enters the sensor through a penetrating face of the semi-reflecting and semi-transmitting device, a light guide device and a first shutter are arranged between a light guide hole formed in the integrating sphere and the semi-reflecting and semi-transmitting device, and reflected light from an inner surface of the integrating sphere enters the sensor through a reflecting surface of the semi-reflecting and semi-transmitting device.

2. The dual-optical-path spectrophotometer according to claim 1, wherein an adjusting device is arranged on each of the lenses, configured to adjust positions of the lenses between the sensor and the detection hole.

3. The dual-optical-path spectrophotometer according to claim 2, wherein the lenses comprise a first lens and a second lens, wherein the semi-reflecting and semi-transmitting device is arranged between the first lens and the second lens, and an adjusting device is arranged on the second lens, configured to adjust a position of the second lens between the semi-reflecting and semi-transmitting device and the detection hole.

4. The dual-optical-path spectrophotometer according to claim 2, wherein the adjusting device comprises a sliding sleeve, a sleeve lever, a V-shaped spring and a fixed structure, wherein the sliding sleeve arranged in a detection cylinder is matched with the lenses through a stepped notch formed inside a top, a lever hole formed in one side of the sliding sleeve is matched with a sliding groove formed in one side of the detection cylinder, the sleeve lever is inserted into the lever hole through the sliding groove, and the fixed structure arranged outside the detection cylinder is connected with the sleeve lever through the V-shaped spring.

5. The dual-optical-path spectrophotometer according to claim 1, wherein the light guide hole is formed above the light-through hole, and a light barrier is arranged below an inner side of the light-through hole.

6. The dual-optical-path spectrophotometer according to claim 1, wherein the semi-reflecting and semi-transmitting device is an inclined semi-reflecting and semi-transmitting glass, an upper surface of the semi-reflecting and semi-transmitting glass is a reflecting surface and a lower surface is a penetrating face.

7. The dual-optical-path spectrophotometer according to claim 1, wherein a light trap hole formed in the integrating sphere is matched with the measuring port and a camera arranged outside the integrating sphere, and a pick is arranged between the light trap hole and the camera.

8. The dual-optical-path spectrophotometer according to claim 3, wherein the adjusting device comprises a sliding sleeve, a sleeve lever, a V-shaped spring and a fixed structure, wherein the sliding sleeve arranged in a detection cylinder is matched with the lenses through a stepped notch formed inside a top, a lever hole formed in one side of the sliding sleeve is matched with a sliding groove formed in one side of the detection cylinder, the sleeve lever is inserted into the lever hole through the sliding groove, and the fixed structure arranged outside the detection cylinder is connected with the sleeve lever through the V-shaped spring.

\* \* \* \* \*